United States Patent
Fugate et al.

(10) Patent No.: US 10,210,197 B2
(45) Date of Patent: Feb. 19, 2019

(54) DYNAMICALLY SCALABLE DISTRIBUTED HETEROGENOUS PLATFORM RELATIONAL DATABASE

(71) Applicant: NEW YORK AIR BRAKE CORPORATION, Watertown, NY (US)

(72) Inventors: Mark L. Fugate, Colleyville, TX (US); Mark W. Crouch, Fort Worth, TX (US)

(73) Assignee: NEW YORK AIR BRAKE CORPORATION, Watertown, NY (US)

( * ) Notice: Subject to any disclaimer, the term of this patent is extended or adjusted under 35 U.S.C. 154(b) by 344 days.

(21) Appl. No.: 14/057,709

(22) Filed: Oct. 18, 2013

(65) Prior Publication Data

US 2015/0112948 A1    Apr. 23, 2015

(51) Int. Cl.
G06F 17/30    (2006.01)
(52) U.S. Cl.
CPC .. *G06F 17/30371* (2013.01); *G06F 17/30194* (2013.01); *G06F 17/30283* (2013.01); *G06F 17/30297* (2013.01); *G06F 17/30312* (2013.01); *G06F 17/30336* (2013.01)
(58) Field of Classification Search
CPC ............. G06F 17/246; G06F 17/30595; G06F 17/3043; G06F 17/30436; G06F 17/30442; G06F 17/30371; G06F 17/30194; G06F 17/30283; G06F 17/30297; G06F 17/30312; G06F 17/30336
USPC ........................................................ 707/687
See application file for complete search history.

(56) References Cited

U.S. PATENT DOCUMENTS

| | | | |
|---|---|---|---|
| 5,596,744 A | 1/1997 | Dao | |
| 7,303,132 B2 | 12/2007 | Knowles et al. | |
| 7,890,927 B2* | 2/2011 | Eldridge | G05B 15/02 700/86 |
| 8,271,430 B2 | 9/2012 | Willson | |
| 8,463,736 B2* | 6/2013 | Bakalash | C03B 37/02718 707/600 |
| 8,793,275 B1* | 7/2014 | Gough | G06F 17/30545 707/770 |
| 8,930,275 B2* | 1/2015 | Heizmann | G06F 11/3664 705/50 |

(Continued)

FOREIGN PATENT DOCUMENTS

WO    9838561 A2    9/1998

OTHER PUBLICATIONS

European Search Report, EPO Form 1507S, European Application No. EP13 89 5720, p. 1-12, dated Apr. 28, 2017.

(Continued)

*Primary Examiner* — Hosain T Alam
(74) *Attorney, Agent, or Firm* — Bond Schoeneck and King PLLC; David Nocilly (57) ABSTRACT

Disclosed embodiments provide a dynamically scalable distributed heterogeneous platform relational database system architecture for collection, management and dissemination of data, wherein the architecture is scalable both in terms of the number of servers making up the distributed database and the topology of the DDB, and wherein database servers may be added or removed without system interruption, and the topology of the DDB can be dynamically morphed.

21 Claims, 3 Drawing Sheets

(56) References Cited

U.S. PATENT DOCUMENTS

| | | | |
|---|---|---|---|
| 2004/0030739 A1 | 2/2004 | Yousefi | |
| 2004/0098359 A1* | 5/2004 | Bayliss | G06F 17/30445 |
| 2004/0186826 A1* | 9/2004 | Choi | G06F 17/3043 |
| 2004/0215599 A1* | 10/2004 | Apps | G06N 5/025 |
| 2005/0050069 A1* | 3/2005 | Vaschillo | G06F 17/30595 |
| 2008/0071755 A1* | 3/2008 | Barsness | G06F 17/30595 |
| 2008/0256020 A1* | 10/2008 | Wakefield | H04L 29/12169 |
| 2011/0060756 A1* | 3/2011 | Schoenbach | G06F 17/3002 707/769 |
| 2011/0254664 A1 | 10/2011 | Sadr | |
| 2012/0005243 A1* | 1/2012 | Van der Merwe | H04L 41/145 707/812 |
| 2012/0246190 A1 | 9/2012 | Surtani | |
| 2012/0272253 A1* | 10/2012 | Klein | G06F 11/3006 719/330 |
| 2012/0310986 A1* | 12/2012 | Frantz | G06F 17/30306 707/792 |
| 2013/0060742 A1* | 3/2013 | Chang | G06F 17/30359 707/704 |
| 2014/0236933 A1* | 8/2014 | Schoenbach | G06F 17/3005 707/723 |
| 2014/0279873 A1* | 9/2014 | Somerfield | G06F 17/30132 707/610 |

OTHER PUBLICATIONS

Communication from the European Patent Office dated Apr. 17, 2018, regarding PCT/US2013065672.
International Search Report Form PCT/ISA/220, International Application No. PCT/US13/65672, pp. 1-8, dated Apr. 29, 2014.

* cited by examiner

DYNAMICALLY SCALABLE DISTRIBUTED HETEROGENOUS PLATFORM RELATIONAL DATABASE

FIELD OF THE INVENTION

Disclosed embodiments are directed, generally, to a system and methodologies for distributed databases that are dynamically scalable in terms of the number of servers making up the databases and the topology thereof.

DESCRIPTION OF THE RELATED ART

Distributed computing involves the use of distributed systems, which are software systems in which components located on networked computers communicate and coordinate their actions to achieve a common goal. Although distributed systems have many variations, all distributed systems utilize concurrent or redundant components and are susceptible to independent failure of components. Examples of distributed systems include service oriented architecture based systems, massively multiplayer online games and peer-to-peer applications.

In distributed computing and, more generally, in computer networking, a two-phase commit protocol, which is a distributed algorithm, coordinates all the processes that participate in a distributed data transaction as to whether to commit or abort the transaction. The two-phase commit protocol is robust in that it achieves its goal even in some cases of temporary system failure (involving process, network node, communication, etc.).

However, two-phase commit protocols are not resilient to all possible failure configurations and can require system administrator intervention to remedy an outcome. As a result, logging of protocol's states must be performed to enable recovery procedures. In a "normal execution" of any single distributed transaction, i.e., when no failure occurs, which is typically the most frequent situation, the protocol consists of two phases: a commit-request phase and a commit phase.

In the commit-request phase (or voting phase), a coordinator process attempts to prepare all the transaction's participating processes (named participants, cohorts, or workers) to take the necessary steps for either committing or aborting the transaction and to vote, either "Yes": commit (if the transaction participant's local portion execution has ended properly), or "No": abort (if a problem has been detected with the local portion).

In the commit phase, the coordinator decides whether to commit (only if all have voted "Yes") or abort the transaction (otherwise), based on voting of the cohorts and notifies the result to all the cohorts. The cohorts then follow with the needed actions (commit or abort) with their local transactional resources (also called recoverable resources; e.g., database data) and their respective portions in the transaction's other output (if applicable).

SUMMARY

The following presents a simplified summary in order to provide a basic understanding of some aspects of various disclosed embodiments. The summary is not an extensive overview of the invention. It is neither intended to identify key or critical elements of the invention nor to delineate the scope of the invention. The following summary merely presents some concepts of the disclosed embodiments in a simplified form as a prelude to the more detailed description below.

Disclosed embodiments provide a dynamically scalable distributed heterogeneous platform relational database used for collection, management and dissemination of data.

At least one disclosed embodiment provides a system that is dynamically scalable in terms of the number of servers making up the Distributed Database (DDB), and the topology of the DDB. Thus, the disclosed embodiment also provides methodologies through which database servers may be added or removed without system interruption, and the topology of the DDB can be dynamically morphed to fit the current needs of its users and applications.

At least one disclosed embodiment provides a system that is fault tolerant in terms of hardware failure and also fault tolerant in terms of data integrity. That is, hardware fault tolerance is provided in the form of replicated data across multiple servers. Furthermore, the disclosed embodiment also provides methodologies that maintain data integrity using a temporospatial indexing strategy, which stores and manipulates data in terms of time and location within space. Thus, the stored data may represent what the data are at some location during some time.

BRIEF DESCRIPTION OF THE DRAWINGS

A more complete understanding of the present invention and the utility thereof may be acquired by referring to the following description in consideration of the accompanying drawings, in which like reference numbers indicate like features, and wherein.

DETAILED DESCRIPTION

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the disclosed embodiments.

In the following description of various invention embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the disclosed embodiments.

Conventional DDBs are essentially a single database comprised of multiple database servers in a fixed network topology. The fixed network topology ensures the integrity and consistency of the data stored within the DDB. Further, insuring that the integrity of the data stored within the DDB requires that the two-phase commit concept be employed. Two-phase commit is a database transaction concept which guarantees the atomicity of a transaction across multiple database servers. Data are committed across all Relational Database Management System (RDBMS) servers within the topology or no data are committed at all.

The DDB system architecture provided in accordance with the disclosed embodiments differs from the conventional network topology in that it is dynamic and defined by the physical member RDBMS servers and the execution topology determined by the agenda server described herein. The agenda server orchestrates query executions on the DDB member servers effectively creating a different DDB topology with every query execution.

The conventionally necessary two-phase commit is unnecessary in the DDB of the disclosed embodiments because the temporospatial of data storage and indexing scheme employed by the disclosed embodiments. More specifically, the temporospatial storage scheme is at least a five dimensional index comprised of an object identifier, time and a three dimensional spatial coordinate pair, and a final time specification of when a datum was entered into the member RDBMS server. This addressing scheme effectively answers the query "What was the datum at this time and location and when did it become visible?" As a result, the latter time specification makes a conventionally necessary, transactional two-phase commit protocol unnecessary.

Disclosed embodiments provide a dynamically scalable distributed heterogeneous platform relational database used for collection and dissemination of data. A Distributed DataBase (DDB) is a data repository comprised of two or more Relational Database Management Systems (RDBMS) deployed upon computer servers which may be geographically dispersed.

Disclosed embodiments provide a system that is dynamically scalable in terms of the number of servers making up the DDB, and the topology of the DDB. That is, database servers may be added or removed without system interruption, and the topology of the DDB can be dynamically morphed to fit the current needs of its users and applications.

Disclosed embodiments also provide a system that is fault tolerant in terms of hardware failure and also fault tolerant in terms of data integrity. That is, hardware fault tolerance is provided in the form of replicated data across multiple servers. Furthermore, data integrity is maintained using a temporospatial indexing strategy, which stores and manipulates data in terms of time and location within space. That is, the data stored represents what the data are at some location during some time.

Temporospatial indexing eliminates the need for a two-phase commit strategy conventionally employed in DDB implementations, which are the current state of the art. Disclosed embodiments maintain the DDB data in the sixth normal form as described by C. J. Date, *Temporal Data and the Relational Model*, Morgan Kaufmann, 2002.

In accordance with disclosed embodiments, grid database architectures provide hardware fault tolerance by spreading data across multiple servers in the form of data shards and data replicas.

Where distributed computing is used to separate load between multiple servers (either for performance or reliability reasons), implementation of a shard approach may also be useful. A data shard is data which is central to the server it resides upon. Conceptually, a data shard may be thought of as a horizontal partition of the DDB. Thus, each individual partition may be thought of as a database shard.

Horizontal partitioning holds rows of a database table separately, rather than being split into columns. Thus, each partition forms part of a shard, which may in turn be located on a separate database server or at a different physical location. This type of partitioning enables division and distribution of the DDB into multiple servers, whereby the total number of rows in each table in each database is reduced, which reduces the index size, which generally improves search performance.

Moreover, a database shard can be placed on separate hardware, and multiple shards can be placed on multiple processors, which further enables distribution of the database over a large number of processors and improves performance. Consistent hashing may be used to perform automatic sharding to spread large loads across multiple smaller services and servers.

Data shard server locations are determined using a linear hash strategy. The DDB provided in accordance with the disclosed embodiments provides similar data shard functionality and data replica (a data replica is a copy of the data which is central to another server) concepts by distributing data across a plurality of servers but does not use the data shard or data replica concept. Instead, in accordance with disclosed embodiments, the data are partitioned and stored across multiple servers based upon the temporospatial concept described above.

This strategy creates a radial basis storage scheme based upon the spatial characteristics of the data. Further, in accordance with the disclosed embodiments, multiple RDBMS servers can have overlapping spatial storage creating a natural data replication, which differs from a grid data replica in that the data being replicated is not assigned to a specific server, but rather is assigned to a space within the DDB. Thus, storage spaces within the DDB may be duplicated across multiple server instances.

Figure 1:
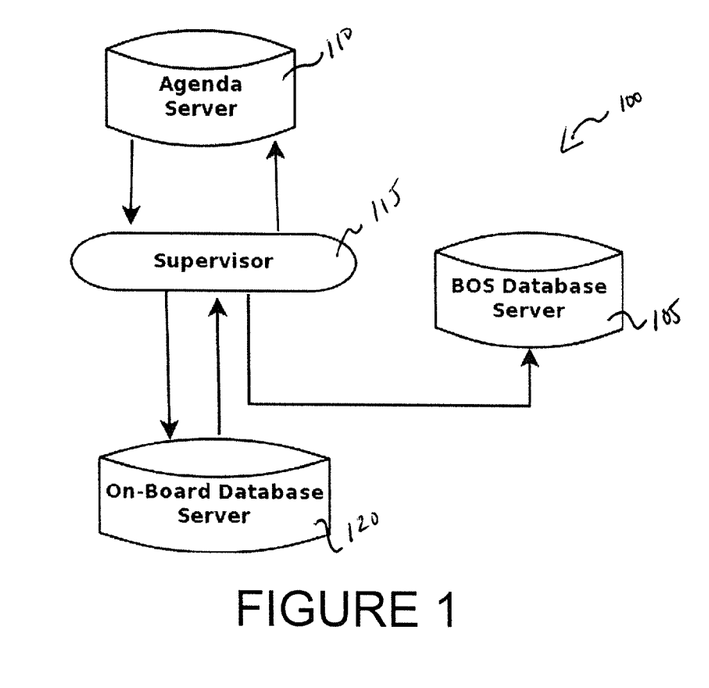
FIG. 1 illustrates one example of a DDB system architecture in which the disclosed embodiments may be implemented to provide improvements through replacement of various components and improved functionality.

In implementation, the disclosed embodiments may be utilized to improve upon production system architecture as shown in FIG. 1, wherein the DDB system architecture 100 includes at least one Back Office Database Server 105, an agenda server 110, a supervisor process module 115 implemented via one or more processors and/or servers and at least one on-board database server 120.

The Back Office Database Server (BODS) 105 stores data collected from the on-board database server 120. The agenda server 110 is a task scheduling mechanism used for scheduling remote task execution on remote servers. The supervisor process module 115 executes tasks provided by the agenda server on remote servers as Remote Procedure Calls (RPC) and reports back the success or failure status of RPCs. The on-board database server collects data generated by an on-train, train control and operator assistance system (for example, commercially available systems marketed by New York Air Brake under the "LEADER" trademark).

Disclosed embodiments may improve upon conventional, production system architecture by incorporating platform agents that are light weight (i.e., computationally simplistic) database platform specific, client applications that function as relays to transform data representations from one platform to ASCII strings.

Thus, the disclosed embodiments may utilize the supervisor process module to transmit RPC's to be executed on a remote server to that remote server's appropriate platform agent; as a result, that platform agent passes the results of the RPC execution back to the supervisor process module. Platform agents may use a simple socket based client-server architecture.

Different RDBMS platforms use their own protocols for communication. Further, different RDBMS platforms also use their own SQL syntactic conventions. Platform agents are designed to address the protocol and syntax RDBMS platform specific issues by being platform specialized in terms of communication protocols and syntactic conventions. That is, an Oracle platform agent is designed to accept a message from an agenda server and transform that message into a RPC stored program execution acceptable by an Oracle RDBMS and then return the results of that execution back to the agenda server. Likewise, an Informix platform agent provides services for Informix RDBMS implementations. Adding a new RDBMS platform to the DDB is simply a matter of adding a platform agent for that platform. This provides a transparent RDBMS gateway for all RDBMS servers within the DDB allowing all of the member servers to function together as a single unit.

Various platforms can be supported using this platform agent strategy including, for example, Oracle, Sybase, PostgreSQL, Informix, MySQL, InfiniDB, DB2, MariaDB, Percona and SQL*Server.

Figure 2:
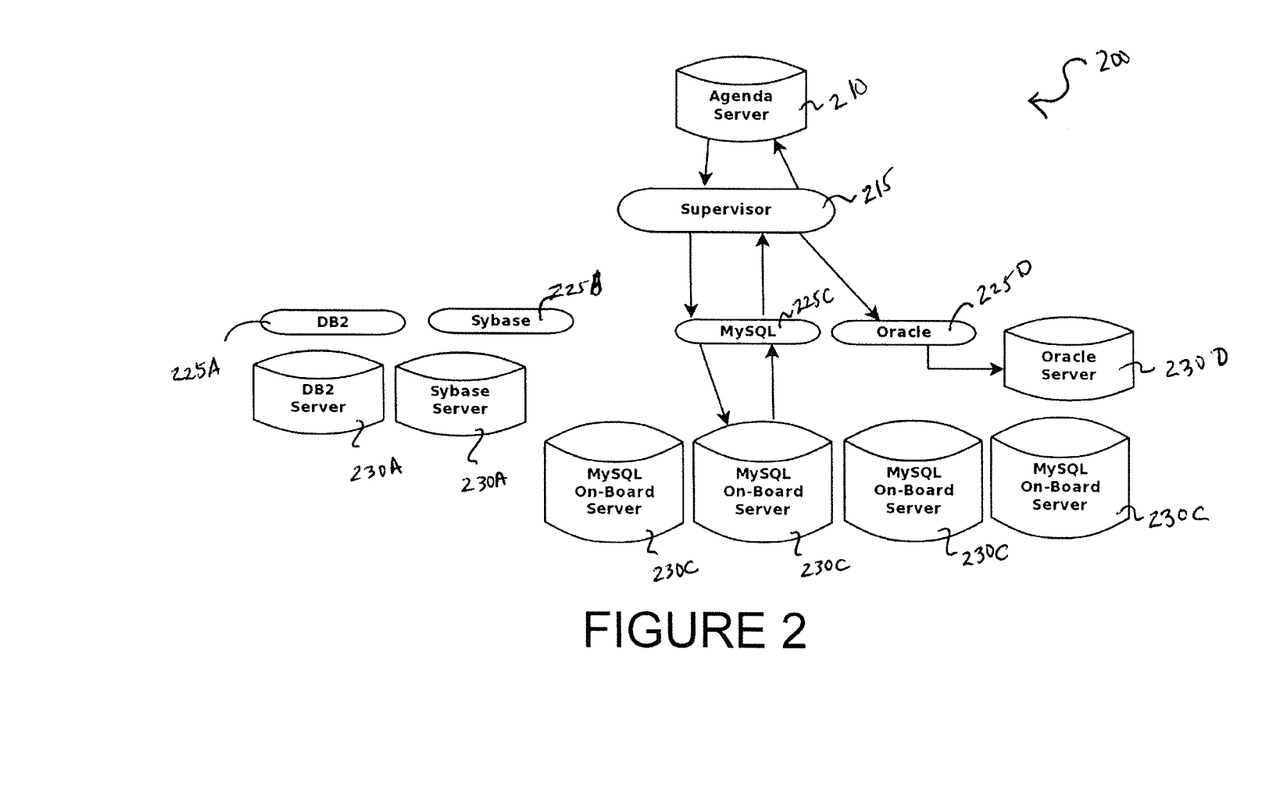
FIG. 2 illustrates one example of a production system architecture that includes the conventionally known functionality associated with an agenda server, and an supervisor process module implemented via one or more processors and/or servers, with additional functionality added to communicate with at least one on-board database server associated with each platform supported by the system architecture.

Accordingly, as illustrated in FIG. 2, disclosed embodiments provide a production system architecture that includes the conventionally known functionality associated with an agenda server 210, and an supervisor process module 215 implemented via one or more processors and/or servers, with additional functionality added to communicate with at least one on-board database server 220 associated with each platform supported by the system architecture.

Additionally, the Back Office Database Server may be replaced by production system architecture components that implement and provide a dynamically scalable heterogeneous network of database servers that provide task scheduling of remote task executions on remote database servers in an asynchronous manner.

For example, as shown in FIG. 2, remote database servers 230 can be deployed upon various database server platforms making the distributed database network heterogeneous. Thus, as shown in FIG. 2, the MySQL database server 230C can be deployed upon the MySQL platform. That MySQL remote database server 230C provides both the heterogeneous distributed database structure and also enables connection to a number of servers, e.g., the MySQL on-board servers 230C. Thus, these MySQL on-board servers 230 may be dynamically added and removed from the network 200. As explained below, in one potential implementation, each of those MySQL on-board servers 230C (or any other server 230A-D) may correspond to a server located on-board a train or locomotive or other vehicle being monitored for data. This implementation is particularly useful because inclusion and removal of such on-board components may be necessary as a result of a train coming on-line or shutting down.

The use of agenda servers and the other components of the disclosed embodiments enable the concept of a dynamic DDB topology. The reason the topology is dynamic is because certain servers (for example, those located remotely on trains), may not be available to address a query via the platform agent. Servers are continually coming in online and going off line. So the topology can potentially change depending on and for each individual query and based on the servers coming online and offline (on both a permanent and temporary basis).

The only requirement is that a remote database server 230A-D has a data model which can be made to be consistent with the data models deployed upon the other platforms, e.g., Oracle, Sybase, PostgreSQL, Informix, MySQL, InfiniDB, DB2, MariaDB, Percona and SQL*Server. In other words, each platform must have constituent components or operations that can be mapped to other constituent components or operations of other platforms. The above-described use of platform agents is one effective mechanism for providing this functionality. Thus, the supervisor process module 215 transmits RPC's to be executed on one of the remote server 230A-D to that remote server's appropriate platform agent 225A-D. Following execution on one of the remote servers 230A-D as a result, that platform agent 225A-D passes the results of the RPC execution back to the supervisor process module 215 using a simple socket based and/or file based client-server architecture. In this way, the supervisor process module 215 is implemented as a dynamically scalable heterogeneous network of supervisor processors that accepts tasks from the associated agenda server 210 and coordinates remote executions of RPCs between the remote database servers 230A-D.

In accordance with the disclosed embodiments, the agenda server 210 may be implemented as a suite of relational database tables and associated stored procedures and can be deployed upon any of the aforementioned database platforms. The system 200 may include one or more agenda servers 210. Agenda servers 210 can be dynamically added and removed from the distributed database network.

The agenda severs 210 each obtain their execution tasks from a relational database agenda implementation which can be implemented on any RDBMS platform.

Agenda servers 210 can manage both recurring scheduled tasks and one time ad hoc tasks and database queries. Because agenda servers 210 may be deployed upon relational database platforms, they may be accessed using the same strategy as the remote database server access. The instances of the agenda server 210 are heterogeneous in that they can be deployed upon any of the aforementioned database server platforms. The only difference is that instances of the agenda server 210 also maintain task execution data.

In this way, the disclosed system architecture 200 includes a dynamically scalable heterogeneous network of platform agents 225 which provide platform specific database client communication services for the supervisor processor module(s) 215 under the direction of the agenda server(s) 210.

The supervisor processor module(s) 215 may be implemented as stand-alone executable programs of instructions running on one or more servers. Each supervisor processor module 215 receives tasks to be executed on the remote database servers 230A-D from an associated agenda server 210. A supervisor processor module 215 is associated with a single agenda server 210. However, many supervisor processor modules 215 can be associated with a single agenda server 210 for the purposes of load balancing and fault tolerance.

Supervisor processor modules 215 communicate with their associated agenda server 210 using a platform agent appropriate for the database platform its agenda server 210 has been deployed upon. Supervisor processor modules 215 report the execution status of their remote executions back to their associated agenda server 210. Supervisor processor modules 215 receive their remote task execution assignments by polling their associated agenda server 210. The agenda server 210 issues current execution task assignments to its supervisor processor modules 215 as well as previously failed task execution assignments.

Supervisor processor modules 215 coordinate communication between the remote database servers 230 in a one-to-many fashion, i.e., one supervisor processor module 215 to one or more remote database servers 230. Accordingly, a supervisor processor module 215 may execute a RPC on a single remote database server 230 and direct the results of that execution to one or more destination servers Thus, servers can be added or removed from the DDB system architecture and their visibility controlled to select member servers throughout the DDB system architecture. This permits subsets of servers to perform data interchange with each other and control the visibility of their data.

Consider the following example of this visibility concept: suppose that data are collected from a set of twelve member servers of the DDB and made visible to a different set of six DDB member servers. Further, suppose that the original set of twelve member servers can be prevented from directly interacting with the second set of six servers, but that a third set of servers could be allowed to interact with both of the previous sets of servers.

Each execution may contain any number of source servers along with zero or more destination servers where data extracted and transformed from source servers are transferred to all of the destination servers specified during the execution cycle. This execution scheme is analogous with the Connection Machine Alpha Beta operations where the Alpha operation in this case is the execution of a stored program on an arbitrary number of source servers and the Beta operation is the transfer of the results of the Alpha execution are propagated to all of the destination servers. See W. Daniel Hillis, The Connection Machine, p. 62.

Accordingly, the source server executions and destination server data transfers can be different with every execution effectively changing the topology of the DDB system architecture with every execution cycle. Thus, both the number of database servers 230 and the number of agenda servers 210 providing task scheduling of remote task executions on remote database servers in an asynchronous manner are dynamically scalable.

The agenda servers 210 may each function independently of each other in an asynchronous manner. This asynchronous execution strategy is a direct result and possible only because of the disclosed embodiments' elimination of the need for the conventionally used two-phase commit strategy incorporated within the state of the art.

This dynamic transfer configuration in combination with the temporospatial data organization scheme enables the entire computer network implementation to operate as a massively parallel distributed n-sphere relational database. Moreover, the system architecture 200 also results in a dynamically scalable heterogeneous network of supervisor processor modules 215 that accept tasks from associated agenda servers 210 and coordinate remote executions of RPCs between remote database servers 230 via the platform agents 225.

Thus, by using the platform agents 225, the system 200 is able to provide platform specific database client communication services for the various supervisor processor modules 215. For example, an Oracle platform agent 225D performs Oracle client communication, whereas a MySQL platform agent 225C performs MySQL client communication.

The platform agents 225 are light weight peer-to-peer agents that listen on a pre-assigned TCP/IP address and port for RPC's sent from a supervisor processor module 215 to be relayed to the database platform they service at the address specified by the supervisor processor module 215. The results of the RPC execution are relayed back to the supervisor processor module 215 by the platform agent upon execution completion.

The supervisor processor module 215 then sends the received results to the platform agents along with the destination addresses to the platform agents which service the destination servers.

Ultimately, a database query is executed on a source database server and the query's results are relayed to any number of destination database servers. A file agent sends command files to the source database server for execution and relays files back to the supervisor processor module 215.

When combined, the above-described functionality enables the ability to catalog all remote database platforms, agenda servers, supervisor processor modules, and platform agents. The distributed database catalog augments any central relational database catalog by describing the distributed database's topology, stored procedures, database server addresses and platform type, agenda addresses and platform type, server login credentials, platform agent addresses and platform types, and the status of each entity within the distributed database.

The servers' extension to the relational catalog may maintain bounding dimensions (data may be symantically clustered together) of the data stored within each individual member server within the DDB system architecture.

In this way, the disclosed embodiments may provide a distributed database system architecture that is fault tolerant in terms of hardware failure and also fault tolerant in terms of data integrity. Furthermore, because data integrity is maintained using a temporospatial indexing strategy, the need for a two-phase commit strategy conventionally employed in DDB system architecture implementations is advantageously eliminated.

Accordingly, it should be understood that individual agenda servers 210 may receive their tasks by continually polling the RDBMS they are associated with using the appropriate platform agent for that RDBMS (platform agents are described in section three).

A representation of task executions may be in the form of a two-sided, Left-Hand-Side (LHS) source server, and Right-Hand-Side (RHS) destination server list. Thus, in one implementation, an agenda server may start an execution process by performing a RPC as a stored program execution on all LHS servers using the appropriate platform agents for each server. The platform agents can then pass the execution results from each LHS server back to the agenda server, which then performs a RPC stored program execution on each RHS server again using the appropriate platform agent for each of the RHS destination servers. The agenda server may then report the success or failure status of the execution back to an agenda database and subsequently poll that agenda database for another task to execute.

In this way, failed executions may be repeatedly attempted as new executions until all LHS and RHS executions succeed. As a result, the agenda servers need not maintain any error status data for execution tasks because that information is provided in the agenda database of the overall system architecture.

As discussed briefly above, in one potential implementation, the remote servers may correspond to servers located on-board trains or locomotives or other vehicles being monitored. Thus, it should be understood that disclosed embodiments may manage data generated by or be coupled to on-train, train control and operator assistance system components including, for example, a Positive Train Control (PTC) system module that may include hardware, software, firmware or some combination thereof that provide a speed display, a speed control unit on at least one locomotive of the train, a component that dynamically informs the speed control unit of changing track or signal conditions, an on board navigation system and track profile database utilized to enforce fixed speed limits along a train route, a bi-directional data communication link configured to inform signaling equipment of the train's presence so as to communicate with centralized PTC systems that are configured to directly issue movement authorities to trains.

Positive Train Control (PTC) refers to conventionally known technology that is designed to prevent train-to-train collisions, overspeed derailments, casualties or injuries to roadway workers operating within their limits of authority as a result of unauthorized incursion by a train as well as prevent train movements through a switch left in the wrong position. Although PTC systems vary widely in complexity and sophistication based on the level of automation and functionality they implement, the system architecture utilized and the degree of train control they are capable of assuming, PTC systems are consistent in that they are processor-based signal and train control systems (see Title 49 Code of Federal Regulations (CFR) Part 236, Subpart H) that utilize both computers and radio data links to accomplish PTC functions, e.g., monitoring and controlling train movements to provide increased safety.

More specifically, PTC requires that a train receives information about its location and where it is allowed to safely travel, i.e., "movement authorities." Equipment on board the train enforces these movement authorities thereby preventing unsafe movement. PTC systems use Global Positioning System (GPS) navigation to track train movements. Thus, PTC is meant to provide train separation or collision avoidance, line speed enforcement, temporary speed restrictions and ensure rail worker wayside safety.

Figure 3:
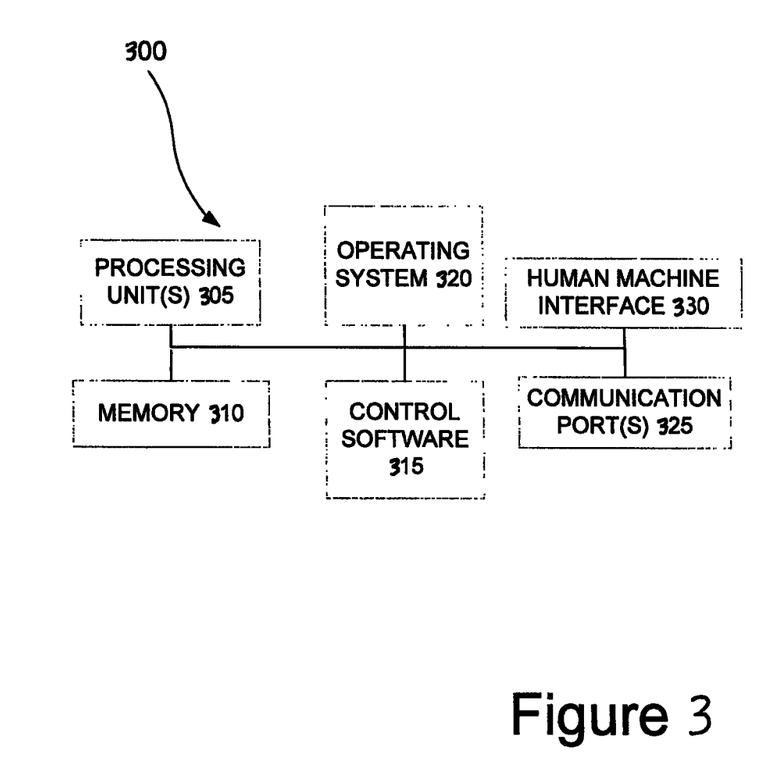
FIG. 3 illustrates an example of equipment that may be used to provide or include on-board train equipment including an on-board server used in the DDB system architecture of the disclosed embodiments.

FIG. 3 illustrates an example of equipment that may be used to provide or include on-board train equipment including an on-board server used in the DDB system architecture of the disclosed embodiments. Thus, to perform the PTC operations, the train intelligence provided to perform operations for the on-board server may include (but is not limited to) the equipment illustrated in FIG. 3. Regardless of the implementation, the train intelligence 300 may include one or more computer processing units 305 that may be coupled to memory 310 (implemented as one or more conventionally known and commercially available programmable and/or read only or reprogrammable memory devices). The memory 310 may serve to store computer instructions associated with or implementing both control software 315 and optionally an operating system or environment 320 for performing operations included in one or more computer applications, software code packages and/or various called or included subroutines. These instructions may be used to perform the instructions included in the methodologies and determinations described above.

Moreover, the train intelligence may also include one or more communication ports 325 that enable both receipt and transmission of messaging and signaling (such as the signaling received from the wayside transponders), data and control instructions in accordance with the disclosed embodiments. Furthermore, the train intelligence 300 may include a human machine interface 330 that may include, for example, a display that enables an operator to receive and review data utilized or produced by the train intelligence 300, provide instruction or input direction to the control software 315, access data included in the memory 310, etc.

As a result, the human machine interface 330 may also include other conventionally known features including a keyboard, a mouse, a touch pad, various buttons and switches, etc.

Various benefits may be achieved by analyzing and accessing data generated as a result of using the PTC system; for example, the information obtained and analyzed by PTC systems can enable on-board and off-board systems to control the train and constituent locomotives to increase fuel efficiency and to perform locomotive diagnostics for improved maintenance. Because the data utilized by the PTC system is transmitted wirelessly, other applications can use the data as well.

Thus, further utility is provided by using and having access to the equipment illustrated in FIG. 3 in combination with the DDB system architecture and methodologies disclosed herein.

It should be understood that various connections are set forth between elements in the following description; however, these connections in general, and, unless otherwise specified, may be either direct or indirect, either permanent or transitory, and either dedicated or shared, and that this specification is not intended to be limiting in this respect.

While this invention has been described in conjunction with the specific embodiments outlined above, it is evident that many alternatives, modifications and variations will be apparent to those skilled in the art. Accordingly, the various embodiments of the invention, as set forth above, are intended to be illustrative, not limiting. Various changes may be made without departing from the spirit and scope of the invention.

Additionally, it should be understood that the functionality described in connection with various described components of various invention embodiments may be combined or separated from one another in such a way that the architecture of the invention is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Various components of the invention may be provided in alternative combinations operated by, under the control of or on the behalf of various different entities or individuals.

Further, it should be understood that, in accordance with at least one embodiment of the invention, system components may be implemented together or separately and there may be one or more of any or all of the disclosed system components. Further, system components may be either dedicated systems or such functionality may be implemented as virtual systems implemented on general purpose equipment via software implementations.

As a result, it will be apparent for those skilled in the art that the illustrative embodiments described are only examples and that various modifications can be made within the scope of the invention as defined in the appended claims.

What is claimed is:

1. A train management system, comprising:
a human machine interface located on a train;
a communication port located on the train;
an operating system positioned on board the train and coupled to the human machine interface and communication port, wherein the operating system has a dynamically scalable, distributed, heterogeneous platform, relational database for collection and dissemination of data received from the human machine interface and the communication port to a remote system, the database that comprises
- at least one agenda server on board the train that obtains execution tasks from a relational database agenda implemented on an RDBMS platform, wherein the at least one agenda server manages both recurring scheduled tasks and one time ad hoc tasks and database queries;
- at least one supervisor process module running on at least one server on board the train, the supervisor process module receiving tasks for execution from the at least one associated agenda server on that train;
- a plurality of database servers, one of which is located on board the train, for storing data and performing operations under the direction of the at least one supervisor process module; and
- a plurality of platform agents, which each provide platform specific database client communication services for the at least one supervisor process module under direction of the at least one agenda server,
- wherein the at least one supervisor process module transmits remote procedure calls to one or more of the plurality of database servers that are not located on board the train for execution by those database servers' corresponding platform agents, wherein those platform agents pass the results of the remote procedure calls' execution back to the supervisor process module located on the train.

2. The train management system of claim 1, wherein the system architecture is dynamically scalable in terms of the number of database servers making up the distributed database system and the topology of the distributed database system.

3. The train management system of claim 1, wherein stored data is replicated across multiple database servers of the plurality of database servers.

4. The train management system of claim 1, wherein data integrity is maintained using temporospatial indexing to store and manipulate data stored in the plurality of data base servers in terms of time and location within space, wherein the stored data represents what the data are at a specified location during a specified time.

5. The train management system of claim 1, wherein execution topology is determined by the at least one agenda server, which orchestrates query executions on at least one of the plurality of database servers creating a different execution topology with every query execution.

6. The train management system of claim 1, wherein a temporospatial data storage scheme is used that utilizes at least a five dimensional index comprised of an object identifier, time, a three dimensional spatial coordinate pair, and a final time specification of when a datum was entered into the database system structure.

7. The train management system of claim 6, wherein the temporospatial data storage scheme creates a radial basis storage scheme based upon spatial characteristics of the stored data.

8. The train management system of claim 7, wherein the plurality of database servers have overlapping spatial storage creating a natural data replication, which differs from a grid data replica in that the data being replicated is not assigned to a specific server, but rather is assigned to a space within the database system architecture.

9. The train management system of claim 1, wherein the each of the plurality of platform agents is associated with one of Oracle, Sybase, PostgreSQL, Informix, MySQL, InfiniDB, DB2, MariaDB, Percona and SQL*Server platforms.

10. The train management system of claim 1, wherein at least one of at least one database servers is provided on a train and collects data generated by an on-train, train control and operator assistance system.

11. A method for managing a train, comprising the steps of:
- providing a human machine interface, a communication port, and an operating system positioned on board a train, wherein the operating system is coupled to the human machine interface and communication port to provide a dynamically scalable, distributed, heterogeneous platform, relational database system architecture for collection and dissemination of data received from the human machine interface and the communication port to a remote system, wherein the database system architecture comprises at least one agenda server on board the train, at least one supervisor process module running on at least one server on board the train, a plurality of database servers, one of which is on board the train, and a plurality of platform agents on board the train;
- using the at least one agent server to obtain execution tasks from a relational database agenda implemented on an RDBMS platform, wherein the at least one agenda server manages both recurring scheduled tasks and one time ad hoc tasks and database queries;
- using the at least one supervisor process module to receive tasks from the at least one associated agenda server for execution;
- using the plurality of database servers to store data and perform operations under the direction of the at least one supervisor process module, wherein each provide platform specific database client communication services for the at least one supervisor process module under direction of the at least one agenda server,
- wherein the at least one supervisor process module transmits remote procedure calls to be executed on one or more of the plurality of database servers that are not located on the train to those database servers' corresponding platform agents, wherein those platform agents pass the results of the remote procedure calls' execution back to the supervisor process module located on the train.

12. The method of claim 11, wherein the system architecture is dynamically scalable in terms of the number of database servers making up the distributed database system and the topology of the distributed database system.

13. The method of claim 11, wherein stored data is replicated across multiple database servers of the plurality of database servers.

14. The method of claim 11, wherein data integrity is maintained using temporospatial indexing to store and manipulate data stored in the plurality of data base servers in terms of time and location within space, wherein the stored data represents what the data are at a specified location during a specified time.

15. The method of claim 11, wherein execution topology is determined by the at least one agenda server, which orchestrates query executions on at least one of the plurality of database servers creating a different execution topology with every query execution.

16. The method of claim 11, wherein a temporospatial data storage scheme is used that utilizes at least a five dimensional index comprised of an object identifier, time, a three dimensional spatial coordinate pair, and a final time specification of when a datum was entered into the database system structure.

17. The method of claim 11, wherein the temporospatial data storage scheme creates a radial basis storage scheme based upon spatial characteristics of the stored data.

18. The method of claim 17, wherein the plurality of database servers have overlapping spatial storage creating a natural data replication, which differs from a grid data replica in that the data being replicated is not assigned to a specific server, but rather is assigned to a space within the database system architecture.

19. The method of claim 11, wherein the each of the plurality of platform agents is associated with one of Oracle, Sybase, PostgreSQL, Informix, MySQL, InfiniDB, DB2, MariaDB, Percona and SQL*Server platforms.

20. The method of claim 11, wherein at least one of at least one database servers is provided on a train and collects data generated by an on-train, train control and operator assistance system.

21. The method of claim 11, further comprising adding or removing one or more database servers without system interruption, wherein the topology of the system architecture dynamically changes in accordance with the addition or omission.

* * * * *